US012202120B1

(12) United States Patent
Mikula

(10) Patent No.: US 12,202,120 B1
(45) Date of Patent: Jan. 21, 2025

(54) TOOL CABINET HAVING INTEGRATED CLEANING SYSTEM

(71) Applicant: Ryan Mikula, Somerville, MA (US)

(72) Inventor: Ryan Mikula, Somerville, MA (US)

( * ) Notice: Subject to any disclaimer, the term of this patent is extended or adjusted under 35 U.S.C. 154(b) by 391 days.

(21) Appl. No.: 17/729,100

(22) Filed: Apr. 26, 2022

(51) Int. Cl.

| | |
|---|---|
| ***B08B 3/02*** | (2006.01) |
| ***B08B 3/14*** | (2006.01) |
| ***B08B 13/00*** | (2006.01) |
| ***B25H 3/02*** | (2006.01) |

(52) U.S. Cl.
CPC ............... *B25H 3/028* (2013.01); *B08B 3/02* (2013.01); *B08B 3/14* (2013.01); *B08B 13/00* (2013.01); *B08B 2203/0223* (2013.01); *B08B 2203/027* (2013.01)

(58) Field of Classification Search
CPC .. B25H 3/028; B08B 3/02; B08B 3/14; B08B 13/00; B08B 2203/0223; B08B 2203/027
USPC ........................................................ 134/58 R
See application file for complete search history.

(56) References Cited

U.S. PATENT DOCUMENTS

| | | | | |
|---|---|---|---|---|
| 4,179,307 A * | 12/1979 | Cau | A47L 15/483 134/143 |
| D298,372 S | 11/1988 | Taylor, Jr. | |
| 5,277,209 A | 1/1994 | Olson | |
| 5,332,305 A | 7/1994 | Silvon | |
| 5,700,329 A * | 12/1997 | Edwards | A47L 15/4204 134/155 |
| 6,260,565 B1 | 7/2001 | Welch | |
| 6,997,195 B2 | 2/2006 | Durazzani | |
| 2017/0231464 A1* | 8/2017 | Kong | A47L 15/0076 134/34 |

* cited by examiner

*Primary Examiner* — Tinsae B Ayalew
(74) *Attorney, Agent, or Firm* — Kyle A. Fletcher, Esq.

(57) ABSTRACT

The tool cabinet having integrated cleaning system comprises a tool cabinet, a plurality of drawers, and a cleaning mechanism. The cleaning mechanism may be operable to spray a cleaning solution onto one or more tools stored in the plurality of drawers. Each of the plurality of drawers may comprise a perforated bottom panel such that waste liquid may flow to the bottom of the tool cabinet. The waste liquid may be collected in a sump and may be pumped to a waste reservoir. The cleaning solution may be sprayed onto the one or more tools from spray arms located above each of the plurality of drawers.

18 Claims, 5 Drawing Sheets

TOOL CABINET HAVING INTEGRATED CLEANING SYSTEM

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of rolling cabinets and tool cleaning systems, more specifically, a tool cabinet having integrated cleaning system.

Summary of Invention

The tool cabinet having integrated cleaning system comprises a tool cabinet, a plurality of drawers, and a cleaning mechanism. The cleaning mechanism may be operable to spray a cleaning solution onto one or more tools stored in the plurality of drawers. Each of the plurality of drawers may comprise a perforated bottom panel such that waste liquid may flow to the bottom of the tool cabinet. The waste liquid may be collected in a sump and may be pumped to a waste reservoir. The cleaning solution may be sprayed onto the one or more tools from spray arms located above each of the plurality of drawers.

An object of the invention is to store one or more tools within a plurality of drawers of a tool cabinet.

Another object of the invention is to provide a cleaning solution distribution mechanism that pumps a cleaning solution from a solution reservoir to a plurality of spray arms located above each of the plurality of drawers such that the cleaning solution may be applied to the one or more tools stored within the plurality of drawers.

A further object of the invention is to provide perforated bottom panels on the plurality of drawers such that the waste liquid resulting from spraying the cleaning solution onto the one or more tools may flow to a sump at the bottom of the tool cabinet.

Yet another object of the invention is to provide a waste liquid collection mechanism that may pump the waste liquid from a drain in sump through a waste filter and into a waste reservoir for disposal.

These together with additional objects, features and advantages of the tool cabinet having integrated cleaning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the tool cabinet having integrated cleaning system in detail, it is to be understood that the tool cabinet having integrated cleaning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tool cabinet having integrated cleaning system.

It is therefore important that the claims be regarded as including such equivalent construction insofar as they do not depart from the spirit and scope of the tool cabinet having integrated cleaning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
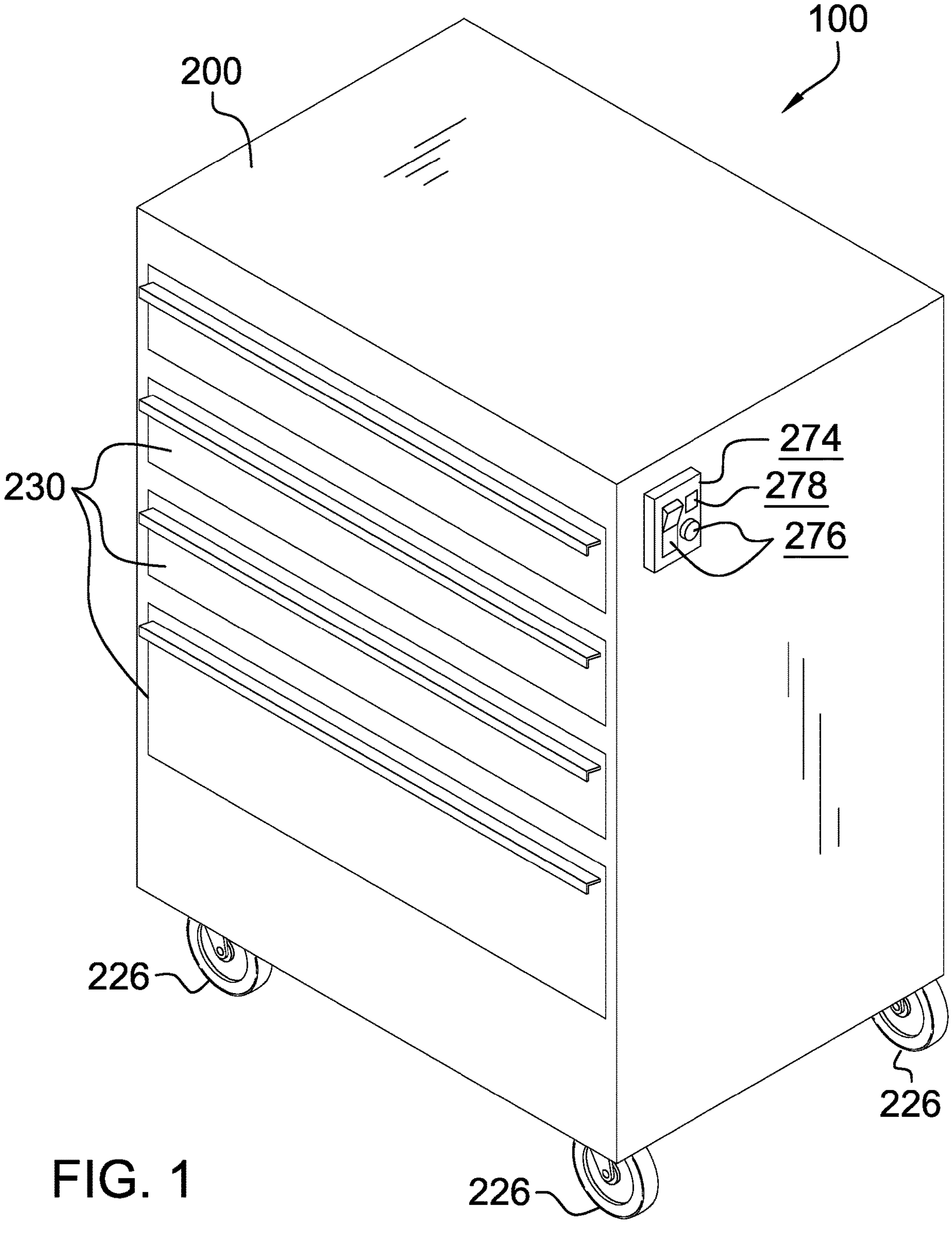
FIG. 1 is a front isometric side view of an embodiment of the disclosure.
Figure 2:
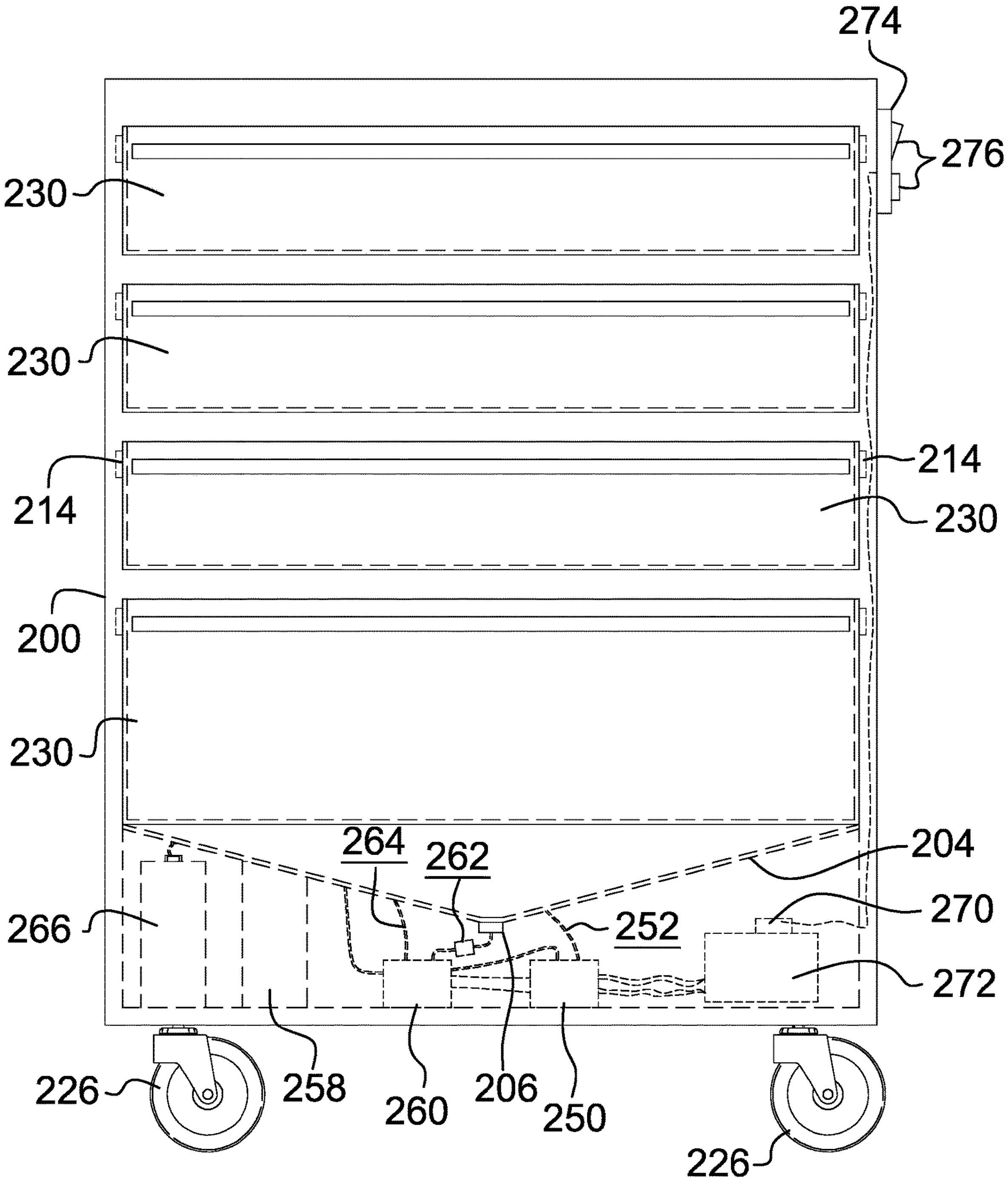
FIG. 2 is a front view of an embodiment of the disclosure.
Figure 3:
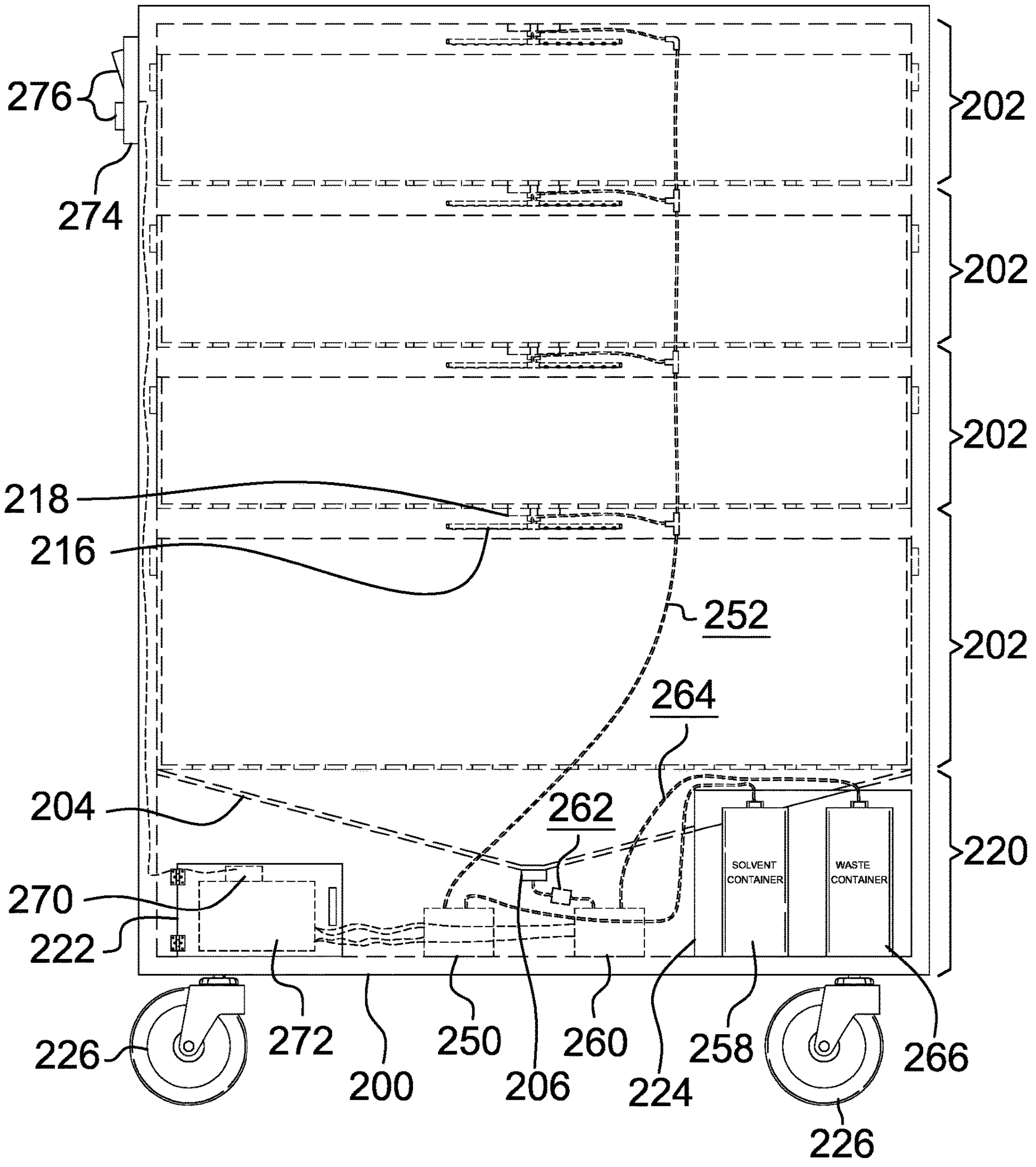
FIG. 3 is a rear view of an embodiment of the disclosure.
Figure 4:
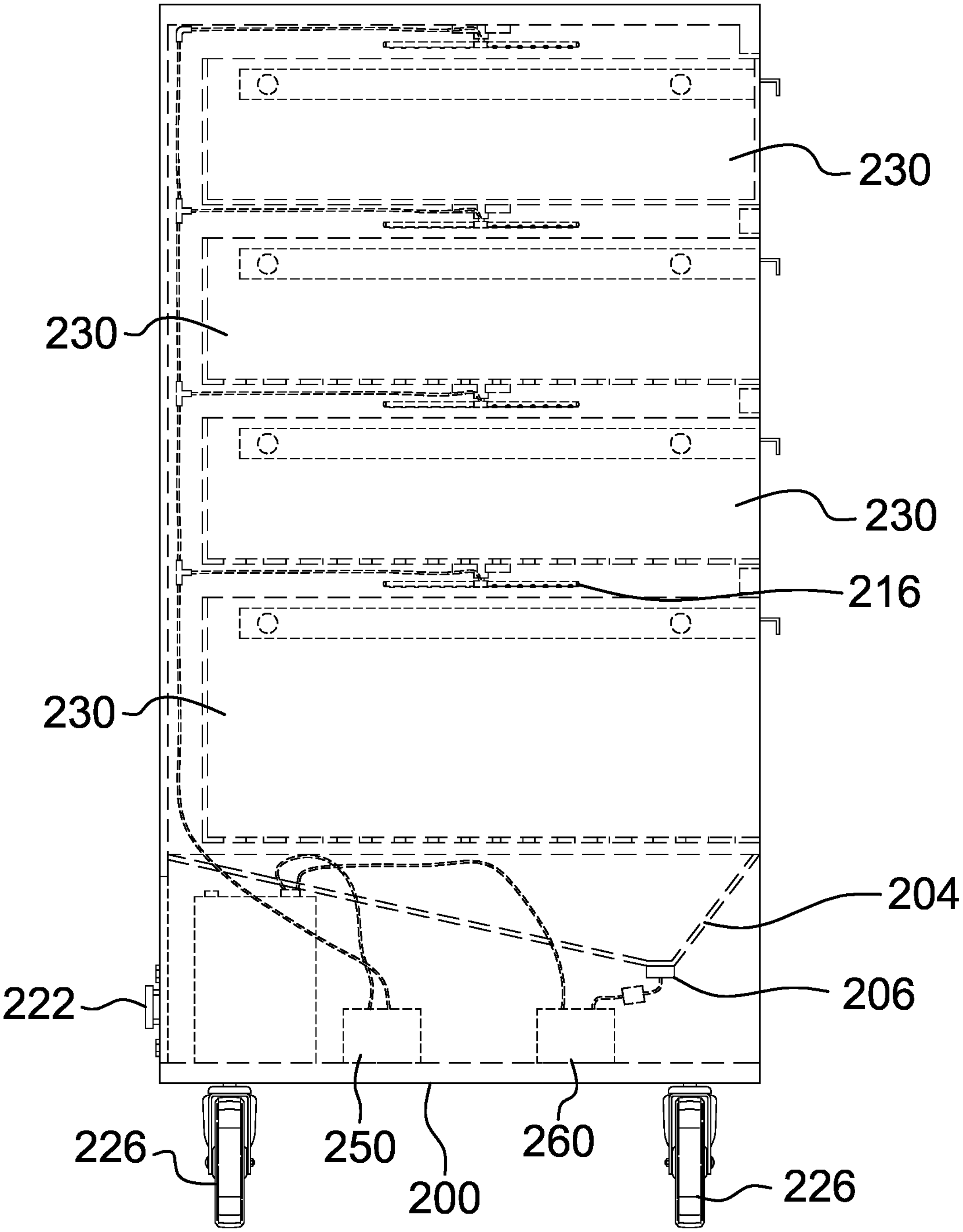
FIG. 4 is a left side view of an embodiment of the disclosure.
Figure 5:
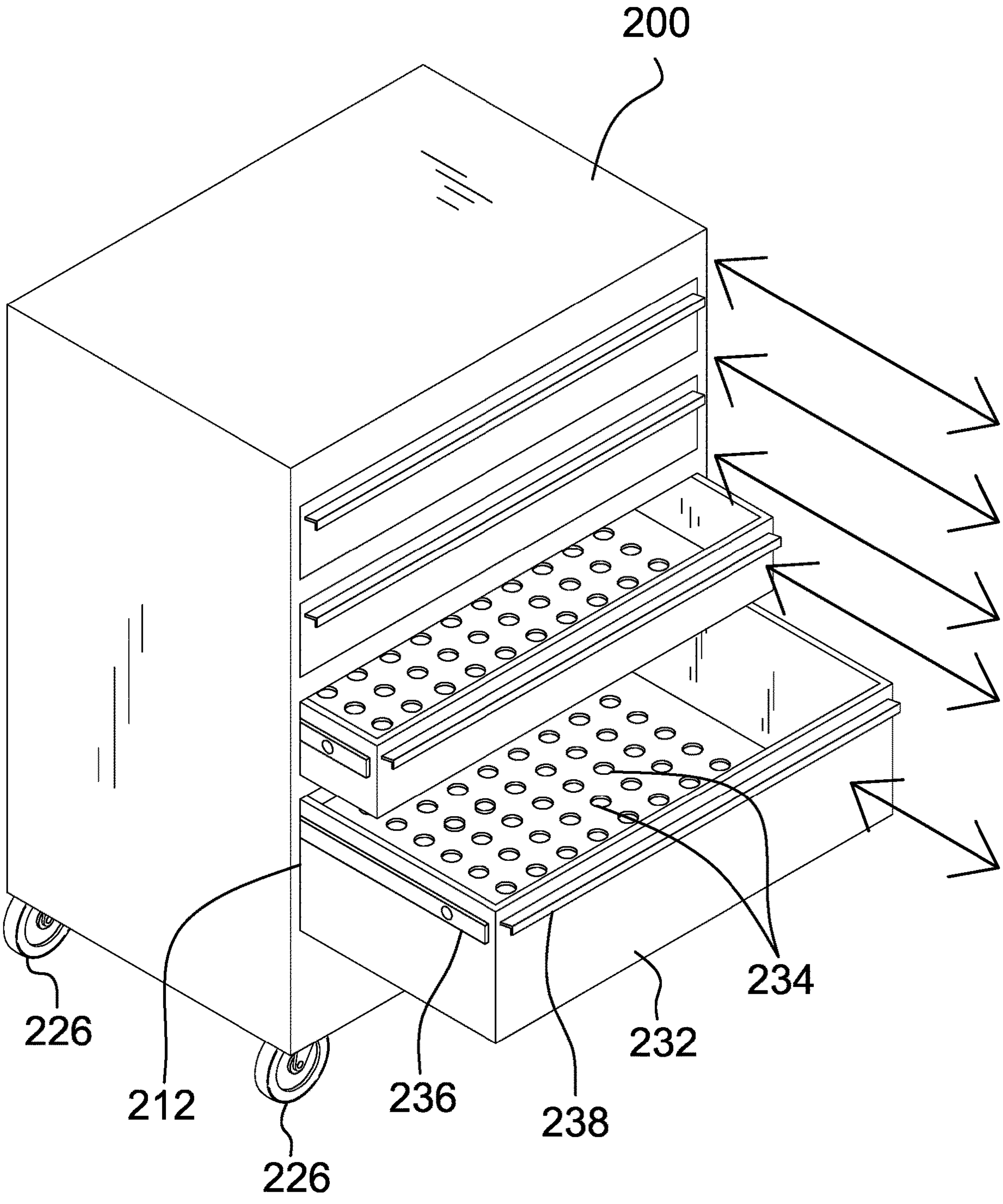
FIG. 5 is a detail isometric view of an embodiment of the disclosure.

Detailed reference will now be made to a first potential embodiment of the disclosure, which is illustrated in FIGS. 1 through 5.

The tool cabinet having integrated cleaning system 100 (hereinafter invention) comprises a tool cabinet 200, a plurality of drawers 230, and a cleaning mechanism. The cleaning mechanism may be operable to spray a cleaning solution onto one or more tools stored in the plurality of drawers 230. Each of the plurality of drawers 230 may comprise a perforated bottom panel 234 such that waste liquid may flow to the bottom of the tool cabinet 200. The waste liquid may be collected in a sump 204 and may be pumped to a waste reservoir 266. The cleaning solution may be sprayed onto the one or more tools from spray arms 216 located above each of the plurality of drawers 230.

The tool cabinet 200 may comprise a plurality of drawer bays 202, the sump 204, an equipment bay 220, and a plurality of castor wheels 226. The plurality of drawer bays 202 may house the plurality of drawers 230. An individual drawer bay selected from the plurality of drawer bays 202 may comprise a drawer aperture 212, a pair of drawer slide tracks 214, and the spray arm 216.

The drawer aperture 212 may be an aperture located on the front of the tool cabinet 200 through which an individual drawer 232 may pass. The pair of drawer slide tracks 214 may be coupled to the sides of the individual drawer bay and may slidably couple to a pair of drawer slides 236 located on the side of the individual drawer 232. The individual drawer 232 may be accessed by sliding the individual drawer 232 out of the individual drawer bay through the drawer aperture 212 while supporting the individual drawer 232 on the pair of drawer slides 236. In some embodiments, the plurality of drawer bays 202 may comprise multiple heights such that the plurality of drawers 230 may be of non-uniform height. The height of the drawer aperture 212 may vary accordingly.

The spray arm 216 may be located at the top of the individual drawer bay. The spray arm 216 may be supported by a crossbar armature 218 that may be coupled to the tool cabinet 200. The spray arm 216 may be operable to dispense the cleaning solution over the contents of the individual drawer 232 when the cleaning solution is pumped to the spray arm 216. The spray arm 216 may swivel as the cleaning solution is pumped through the spray arm 216 and a plurality of nozzles may convert the cleaning solution to a spray and may disperse the spray within the individual drawer 232.

The cleaning solution dispersed within the individual drawer 232 may flow to the bottom of the tool cabinet 200 as the waste liquid and may be collected by the sump 204. The sump 204 may be a depression located at the bottom of the tool cabinet 200. The sump 204 may collect the waste liquid and direct the waste liquid to a drain 206 located at the lowest point in the sump 204.

The equipment bay 220 may be a portion of the interior space of the tool cabinet 200 that may house the cleaning mechanism. The equipment bay 220 may be located at the bottom of the tool cabinet 200. The equipment bay 220 may comprise a battery access door 222 located on the rear of the tool cabinet 200 which may provide access to a battery 272. The equipment bay may comprise a container access aperture 224 located on the rear of the tool cabinet 200 that may provide access to a solution reservoir 258 and to the waste reservoir 266.

The plurality of castor wheels 226 may reduce friction between the tool cabinet 200 and the floor such that the tool cabinet 200 may be easily moved.

The individual drawer 232 may comprise the perforated bottom panel 234, the pair of drawer slides 236, and a drawer pull 238. The individual drawer 232 may provide storage space for the one or more tools. The pair of drawer slides 236 may slidably couple to the pair of drawer slide tracks 214 within the individual drawer bay. The perforated bottom panel 234 may provide an exit for the waste liquid to drain out of the individual drawer 232. The drawer pull 238 may be adapted to be grasped by a user in order to open or close the individual drawer 232.

The cleaning mechanism may comprise a cleaning solution distribution mechanism to dispense the cleaning solution into the plurality of drawers 230 and a waste liquid collection mechanism to collect the waste liquid during a cleaning cycle. The cleaning solution distribution mechanism may comprise the solution reservoir 258 and a solution pump 250. The solution reservoir 258 may be a sealed container for storing the cleaning solution. The cleaning solution may be drawn from the solution reservoir 258 by the solution pump 250. The cleaning solution may then be pumped to the spray arms 216 by the solution pump 250. The cleaning solution may move through solution tubing 252 to pass from the solution reservoir 258 to the solution pump 250 and from the solution pump 250 to the spray arms 216. The solution tubing 252 may branch at a plurality of tee fittings 254 in order to reach the spray arms 216.

The solution pump 250 may move the cleaning solution from the solution reservoir 258 to the spray arms 216. The solution pump 250 may be electromechanical and may comprise a first internal motor that may be energized by a cleaning signal applied to the solution pump 250. As non-limiting examples, the solution pump 250 may move the cleaning solution by applying rotary motion, reciprocating motion, linear motion, or a combination thereof to one or more gears, screws, pistons, shuttle blocks, vanes, diaphragms, plungers, chains, ropes, impellers, or combinations thereof.

The waste liquid collection mechanism may comprise the waste reservoir 266, a waste pump 260, and a waste filter 262. The waste reservoir 266 may be a sealed container for storing the waste liquid. The waste liquid may collect in the sump 204 and may exit the sump 204 through the drain 206. The waste liquid may pass through the waste filter 262 to remove particulates from the waste liquid. The waste liquid may be drawn through the waste filter 262 by the waste pump 260. The waste liquid may then be pumped to the waste reservoir 266 by the waste pump 260 where the waste liquid may collect. The waste liquid may move through waste tubing 264 to pass from the drain 206 to the waste filter 262, from the waste filter 262 to the waste pump 260, and from the waste pump 260 to the waste reservoir 266.

The waste pump 260 may move the waste liquid from the drain 206 of the sump 204 to the waste reservoir 266. The waste pump 260 may be electromechanical and may comprise a second internal motor that may be energized by a collection signal applied to the waste pump 260. As non-limiting examples, the waste pump 260 may move the waste liquid by applying rotary motion, reciprocating motion, linear motion, or a combination thereof to one or more gears, screws, pistons, shuttle blocks, vanes, diaphragms, plungers, chains, ropes, impellers, or combinations thereof.

The tool cabinet 200 may comprise a control panel 274 for operating the cleaning mechanism. The control panel 274 may comprise one or more operator controls 276 and a visual indicator 278. The one or more operator controls 276 may be adapted for the user to turn the cleaning mechanism ON and OFF and to start the cleaning cycle. The visual indicator 278 may visually indicate that the cleaning cycle is in progress.

A microprocessor 270 may be a computer processor that incorporates the functions of a central processing unit in the form of one or more integrated circuits. The microprocessor 270 may comprise internal memory and I/O ports such that the microprocessor 270 may store and execute a stored program, may store and manipulate data, and may monitor and control devices that are external to the microprocessor 270. The stored program may contain instructions for causing the microprocessor 270 to control the sequence and timing of the solution pump 250 and the waste pump 260 during the cleaning cycle. The microprocessor 270 may control the solution pump 250 by energizing and de-energizing the solution pump 250 via the cleaning signal. The microprocessor 270 may control the waste pump 260 by energizing and de-energizing the waste pump 260 via the collection signal.

The battery 272 may comprise one or more energy-storage devices. The battery 272 may be a source of electrical energy to operate the solution pump 250, the waste pump 260, and the microprocessor 270. The battery 272 may be rechargeable.

In use, one or more tools may be stored in the plurality of drawers 230 within the tool cabinet 200. To clean the one or more tools, the user may interact with the one or more operator controls 276 on the control panel 274 to turn the cleaning mechanism ON and start a cleaning cycle. During the cleaning cycle, the microprocessor 270 may energize the solution pump 250 to pump the cleaning solution from the solution reservoir 258 to the spray arms 216 located above each of the plurality of drawers 230. The spray arms 216 may disperse the cleaning solution over the interior of the plurality of drawers 230 and onto the one or more tools. As non-limiting examples, the cleaning solution may be a degreaser, isopropyl alcohol, a water displacing hydrocarbon-based solution, a glass cleaner, a cleaning solvent, or any combination thereof. The cleaning solution may remove dirt, grease, rust, and/or other contamination from the one or more tools. Waste liquid, comprising the cleaning solution plus contamination removed from the one or more tools, may drain through the perforated bottom panel 234 of each of the plurality of drawers 230 to reach the sump 204 located at the bottom of the tool cabinet 200. During the cleaning cycle, the microprocessor 270 may energize the waste pump 260 to draw the waste liquid from the sump 204 through the waste filter 262 and may pump the waste liquid into the waste reservoir 266. As the end of the cleaning cycle, the microprocessor 270 may assure that both the solution pump 250 and the waste pump 260 are de-energized. The solution reservoir may be periodically refilled and the waste reservoir 266 may be periodically emptied.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

As used in this disclosure, an “aperture” may be an opening in a surface or object. Aperture may be synonymous with hole, slit, crack, gap, slot, or opening.

Throughout this document the terms “battery”, “battery pack”, and “batteries” may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words “control” or “controls” are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words “couple”, “couples”, “coupled” or “coupling”, may refer to connecting, either directly or indirectly, and does not necessarily imply a mechanical connection.

As used in this disclosure, a “drawer” may be a storage compartment that is designed to slide into and out of a larger object.

As used herein, “energize” and/or “energization” may refer to the application of an electrical potential to a system or subsystem.

As used herein, “front” may indicate the side of an object that is closest to a forward direction of travel under normal use of the object or the side or part of an object that normally presents itself to view or that is normally used first. “Rear” or “back” may refer to the side that is opposite the front.

As used in this disclosure, the word “interior” may be used as a relational term that implies that an object is located or contained within the boundary of a structure or a space.

As used in this disclosure, a “motor” may refer to a device that transforms energy from an external power source into mechanical energy.

As used herein, the terms “processor”, “central processor”, “central processing unit”, “CPU”, or “microprocessor” may refer 19 to a digital device that carries out the instructions comprising a computer program by performing basic arithmetic, logical, control, and input/out operations. The term “microprocessor” may additionally imply a level of miniaturization and power reduction that makes the device suitable for portable or battery operated systems.

As used in this disclosure, a “pump” may be a mechanical or electromechanical device that uses suction or pressure to raise or move fluids, compress fluids, or force a fluid into an inflatable object. As non-limiting examples, fluids may include both liquids, such as water, and gases, such as air.

As used herein, “reservoir” may refer to a container or containment system that is configured to store a liquid, gas, or gel.

As used in this disclosure, a “spray” may be a plurality of liquid drops projected from a nozzle.

As used in this disclosure, a “tool” may be a device, an apparatus, or an instrument that is used to carry out an activity, operation, or procedure.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tool cabinet having integrated cleaning system comprising:

a tool cabinet, a plurality of drawers, and a cleaning mechanism;

wherein the cleaning mechanism is operable to spray a cleaning solution onto one or more tools stored in the plurality of drawers;

wherein each of the plurality of drawers comprise a perforated bottom panel such that waste liquid flows to the bottom of the tool cabinet;

wherein the waste liquid is collected in a sump and is pumped to a waste reservoir;

wherein the cleaning solution is sprayed onto the one or more tools from spray arms located above each of the plurality of drawers;

wherein the tool cabinet comprises a plurality of drawer bays, the sump, an equipment bay, and a plurality of castor wheels;

wherein the plurality of drawer bays house the plurality of drawers;

wherein an individual drawer bay selected from the plurality of drawer bays comprises a drawer aperture, a pair of drawer slide tracks, and the spray arm;

wherein the equipment bay is a portion of an interior space of the tool cabinet that houses the cleaning mechanism;

wherein the equipment bay is located at a bottom of the tool cabinet;

wherein the equipment bay comprises a battery access door located on the rear of the tool cabinet which provides access to a battery;

wherein the equipment bay comprises a container access aperture located on the rear of the tool cabinet that provides access to a solution reservoir and to the waste reservoir.

2. The tool cabinet having integrated cleaning system according to claim 1 wherein the drawer aperture is an aperture located on the front of the tool cabinet through which an individual drawer passes;

wherein the pair of drawer slide tracks are coupled to the sides of the individual drawer bay and slidably couple to a pair of drawer slides located on the side of the individual drawer;

wherein the individual drawer is accessed by sliding the individual drawer out of the individual drawer bay through the drawer aperture while supporting the individual drawer on the pair of drawer slides.

3. The tool cabinet having integrated cleaning system according to claim 2 wherein the plurality of drawer bays comprise multiple heights such that the plurality of drawers are of non-uniform height.

4. The tool cabinet having integrated cleaning system according to claim 2 wherein the spray arm is located at the top of the individual drawer bay;

wherein the spray arm is supported by a crossbar armature that is coupled to the tool cabinet;

wherein the spray arm is operable to dispense the cleaning solution over the contents of the individual drawer when the cleaning solution is pumped to the spray arm;

wherein the spray arm swivels as the cleaning solution is pumped through the spray arm and a plurality of nozzles convert the cleaning solution to a spray and disperse the spray within the individual drawer.

5. The tool cabinet having integrated cleaning system according to claim 4 wherein the cleaning solution dispersed within the individual drawer flows to the bottom of the tool cabinet as the waste liquid and is collected by the sump;

wherein the sump is a depression located at the bottom of the tool cabinet;

wherein the sump collects the waste liquid and direct the waste liquid to a drain located at the lowest point in the sump.

6. The tool cabinet having integrated cleaning system according to claim 5 wherein the individual drawer comprises the perforated bottom panel, the pair of drawer slides, and a drawer pull;

wherein the individual drawer provides storage space for the one or more tools;

wherein the perforated bottom panel provides an exit for the waste liquid to drain out of the individual drawer;

wherein the drawer pull is adapted to be grasped by a user in order to open or close the individual drawer.

7. The tool cabinet having integrated cleaning system according to claim 6 wherein the cleaning mechanism comprises a cleaning solution distribution mechanism to dispense the cleaning solution into the plurality of drawers and a waste liquid collection mechanism to collect the waste liquid during a cleaning cycle.

8. The tool cabinet having integrated cleaning system according to claim 7 wherein the cleaning solution distribution mechanism comprises the solution reservoir and a solution pump;

wherein the solution reservoir is a sealed container for storing the cleaning solution;

wherein the cleaning solution is drawn from the solution reservoir by the solution pump;

wherein the cleaning solution is pumped to the spray arms by the solution pump.

9. The tool cabinet having integrated cleaning system according to claim 8 wherein the cleaning solution moves through solution tubing to pass from the solution reservoir to the solution pump and from the solution pump to the spray arms;

wherein the solution tubing branches at a plurality of tee fittings in order to reach the spray arms.

10. The tool cabinet having integrated cleaning system according to claim 9 wherein the solution pump moves the cleaning solution from the solution reservoir to the spray arms;

wherein the solution pump is electromechanical and comprises a first internal motor that is energized by a cleaning signal applied to the solution pump.

11. The tool cabinet having integrated cleaning system according to claim 10 wherein the solution pump moves the cleaning solution by applying rotary motion, reciprocating motion, linear motion, or a combination thereof to one or more gears, screws, pistons, shuttle blocks, vanes, diaphragms, plungers, chains, ropes, impellers, or combinations thereof.

12. The tool cabinet having integrated cleaning system according to claim 10 wherein the waste liquid collection mechanism comprises the waste reservoir, a waste pump, and a waste filter;

wherein the waste reservoir is a sealed container for storing the waste liquid;

wherein the waste liquid collects in the sump and exits the sump through the drain;

wherein the waste liquid passes through the waste filter to remove particulates from the waste liquid;

wherein the waste liquid is drawn through the waste filter by the waste pump;

wherein the waste liquid is pumped to the waste reservoir by the waste pump where the waste liquid collects.

13. The tool cabinet having integrated cleaning system according to claim 12 wherein the waste liquid moves through waste tubing to pass from the drain to the waste filter, from the waste filter to the waste pump, and from the waste pump to the waste reservoir.

14. The tool cabinet having integrated cleaning system according to claim 13 wherein the waste pump moves the waste liquid from the drain of the sump to the waste reservoir;

wherein the waste pump is electromechanical and comprises a second internal motor that is energized by a collection signal applied to the waste pump.

15. The tool cabinet having integrated cleaning system according to claim 14 wherein the waste pump moves the waste liquid by applying rotary motion, reciprocating motion, linear motion, or a combination thereof to one or more gears, screws, pistons, shuttle blocks, vanes, diaphragms, plungers, chains, ropes, impellers, or combinations thereof.

16. The tool cabinet having integrated cleaning system according to claim 14 wherein the tool cabinet comprises a control panel for operating the cleaning mechanism;

wherein the control panel comprises one or more operator controls and a visual indicator;

wherein the one or more operator controls are adapted for the user to turn the cleaning mechanism ON and OFF and to start the cleaning cycle;

wherein the visual indicator visually indicates that the cleaning cycle is in progress.

17. The tool cabinet having integrated cleaning system according to claim 16 wherein a microprocessor is a computer processor that incorporates the functions of a central processing unit in the form of one or more integrated circuits;

wherein the microprocessor comprises internal memory and I/O ports such that the microprocessor stores and executes a stored program, stores and manipulates data, and monitor and controls devices that are external to the microprocessor;

wherein the stored program contains instructions for causing the microprocessor to control the sequence and timing of the solution pump and the waste pump during the cleaning cycle;

wherein the microprocessor controls the solution pump by energizing and de-energizing the solution pump via the cleaning signal;

wherein the microprocessor controls the waste pump by energizing and de-energizing the waste pump via the collection signal.

18. The tool cabinet having integrated cleaning system according to claim 17 wherein the battery comprises one or more energy-storage devices;

wherein the battery is a source of electrical energy to operate the solution pump, the waste pump, and the microprocessor;

wherein the battery is rechargeable.

* * * * *